June 9, 1953    A. BÜCHI    2,641,442
TURBINE

Filed May 8, 1947    7 Sheets-Sheet 1

INVENTOR:

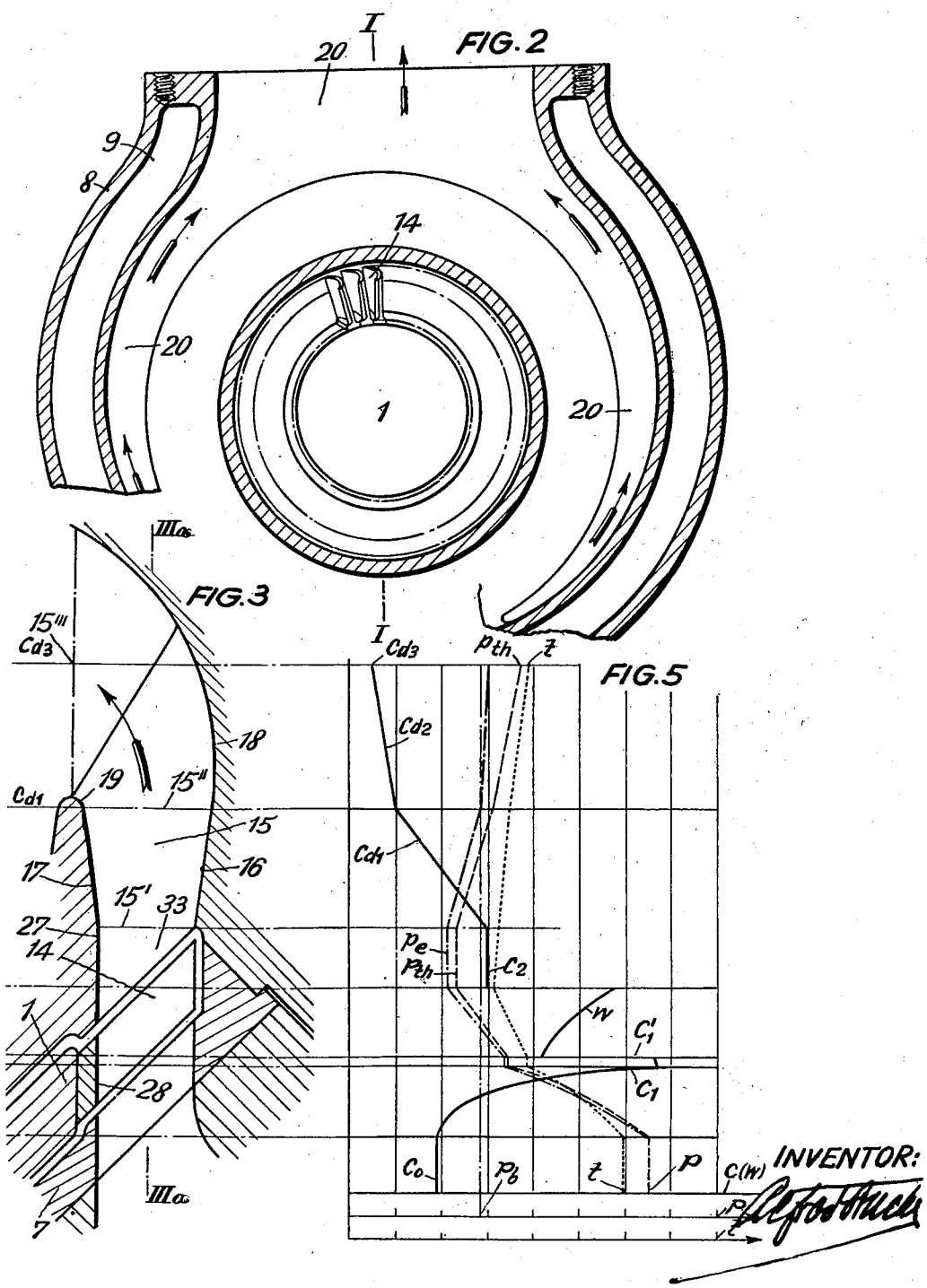

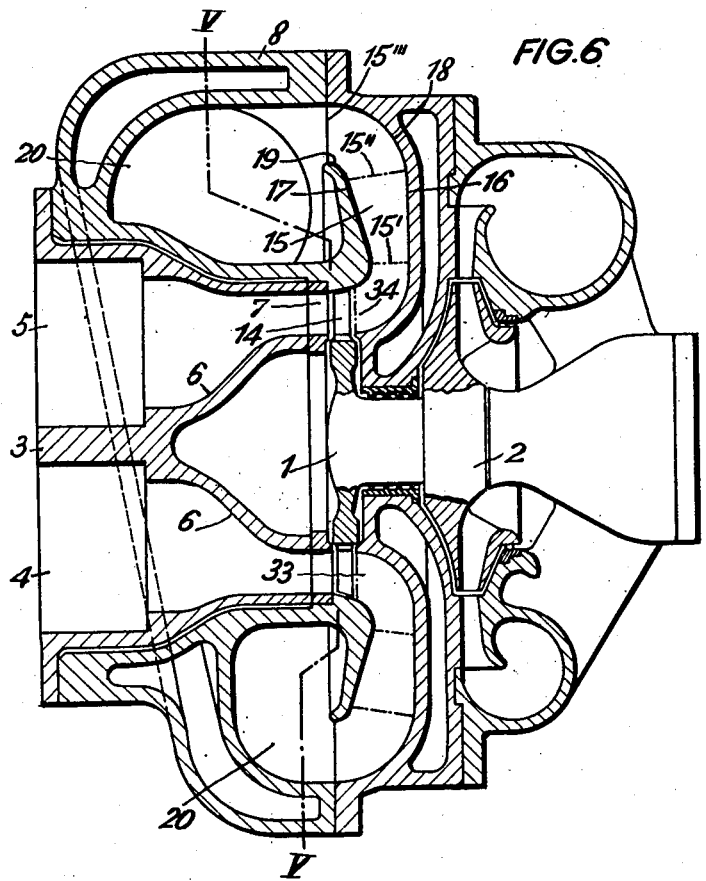

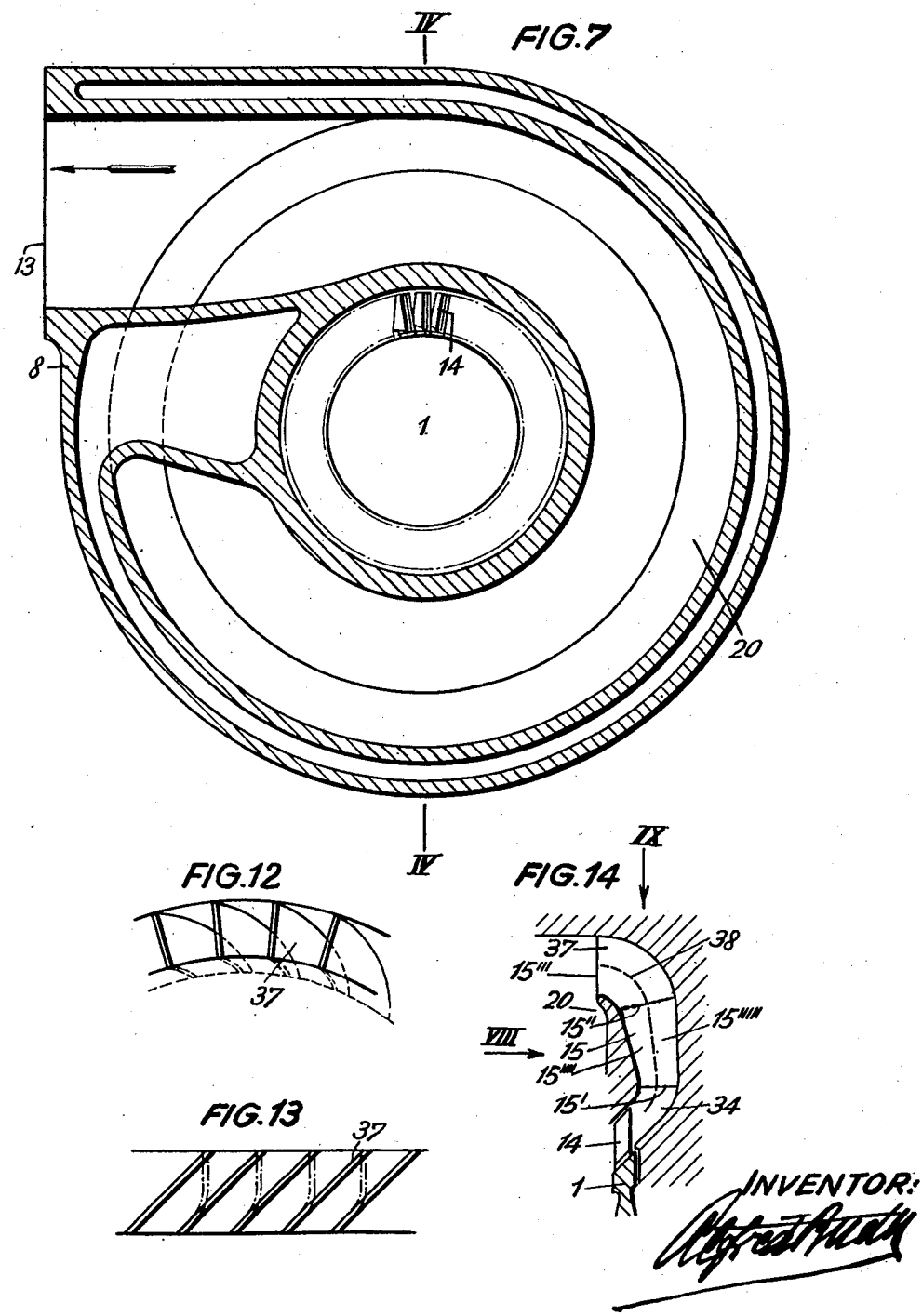

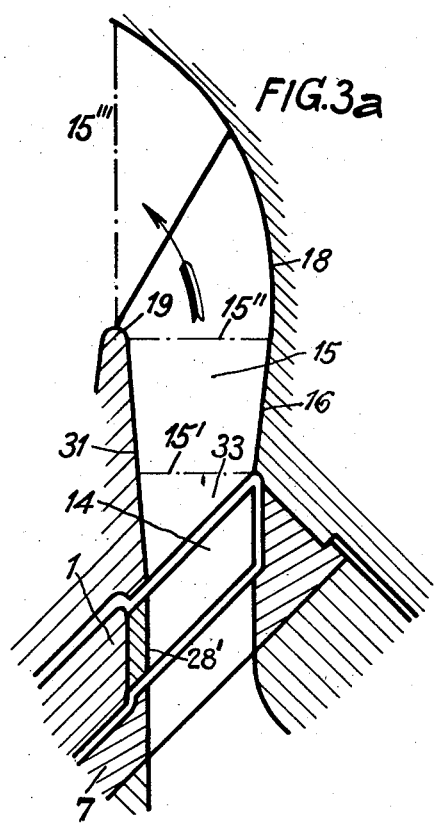
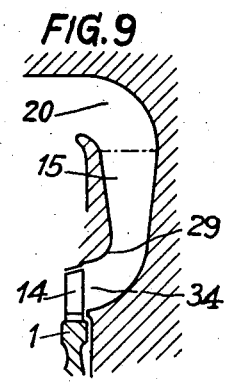

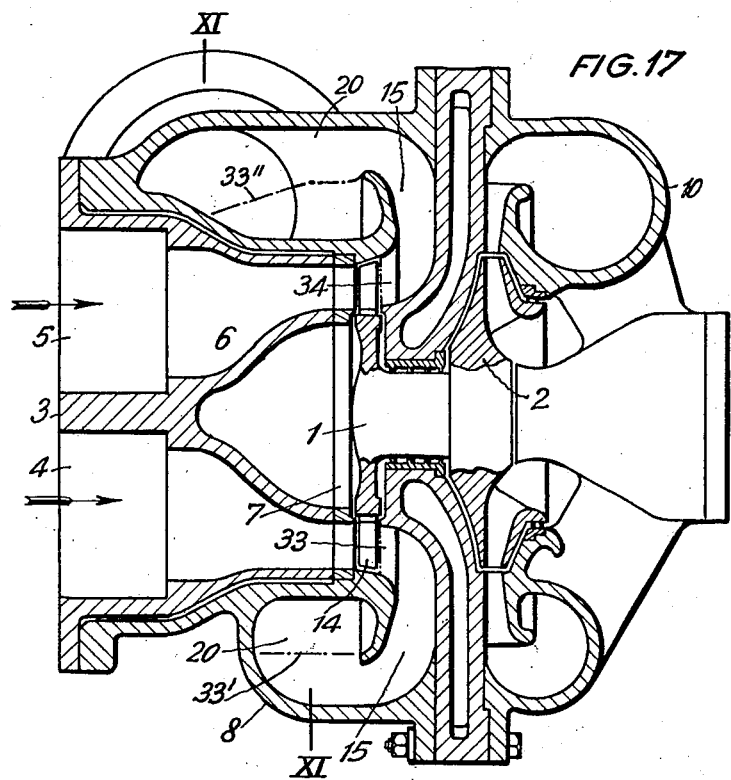
FIG. 17
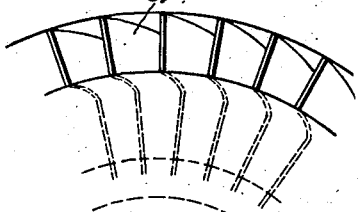
FIG. 15
FIG. 16
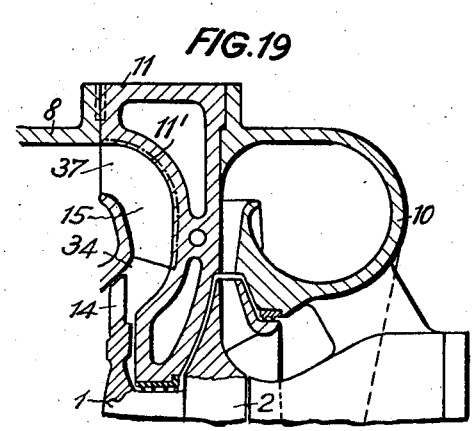
FIG. 19
INVENTOR:

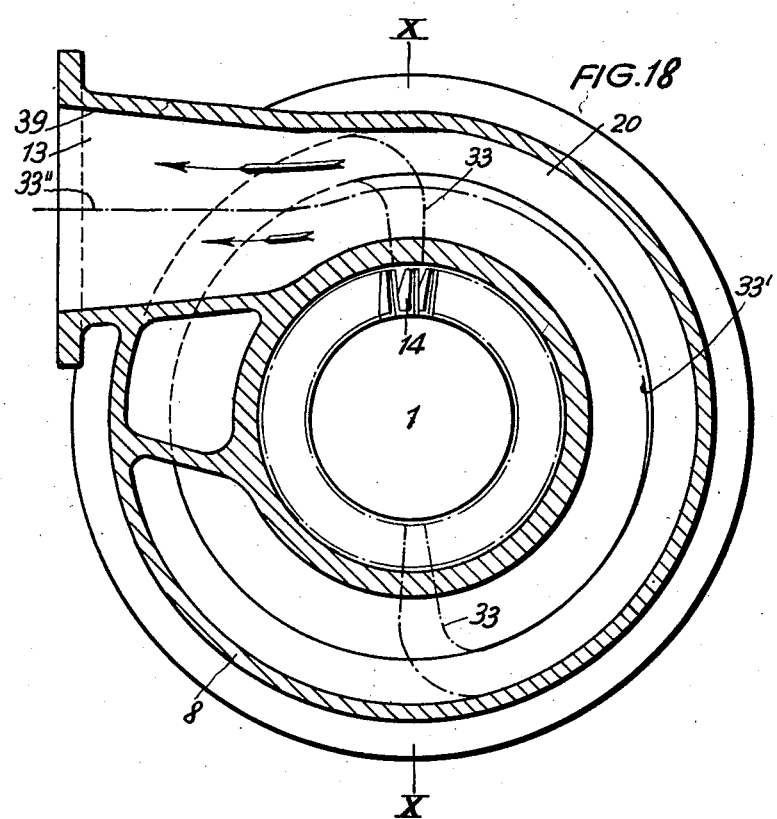
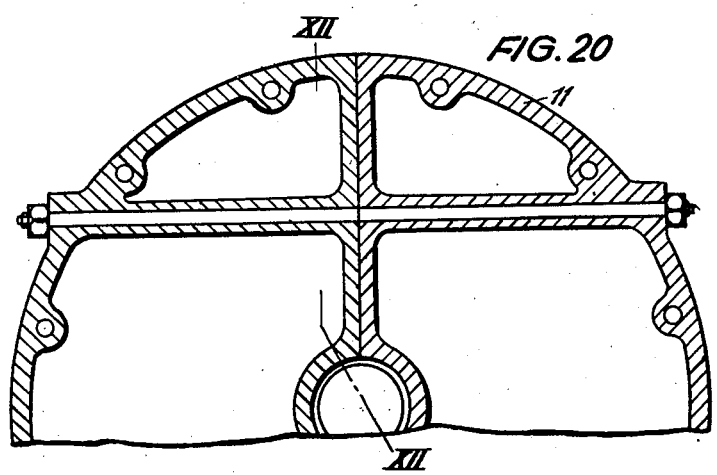

Patented June 9, 1953

2,641,442

UNITED STATES PATENT OFFICE 2,641,442

TURBINE

Alfred Büchi, Winterthur, Switzerland

Application May 8, 1947, Serial No. 746,671
In Switzerland May 10, 1946

12 Claims. (Cl. 253—65)

My present invention relates to improvements in turbines in general, and in particular to a turbine design (mainly for hot gases) having—partly at least—axial admission.

My invention consists in providing, in turbines of the class indicated, a diffusor formed of walls diverging in direction of flow of the pressure fluid, at least downstream of a rotor blading. The pressure fluid, after having been delivered by the rotor, is received in the said diffusor under a partial vacuum in the direction of flow and conducted at decreasing velocity and increasing pressure, toward the turbine delivery opening. The objects of my present invention are:

1. To provide a diffusor design in which at least one of the two inner or outer diffusor walls is defined by (partly at least) a surface of a cone. The enclosing diffusor walls may diverge, in direction of the pressure-fluid flow profile, at a point only where the diffusor-entrance cross-section is substantially at right angles to the diffusor direction, the pressure-fluid upon its delivery from the rotor-blading foot-end being led onward first (at least for some distance) in its initial direction.

2. To afford a diffusor design, wherein at least one of the two diffusor walls is formed (partly at least) by a generatrix curved in the direction of gas flow so as to bring about a maximum conversion of gas velocity into pressure. The rate or degree of diffusor flare may increase in the direction of flow, e. g. with a decreasing gas velocity. One of the two diffusor walls at least, also may have in its axial section an approximately straight-line joined to a curved generatrix. The curved generatrix may have a gradually decreasing degree of curvature. The diffusor, further, may comprise an exit opening, which (partly at least) is radially aligned, at its transition into the turbine-outlet scroll case or into the atmosphere. The design, further, may be such as to first deflect the pressure-fluid upon its exit from the rotor—while substantially maintaining its exit velocity—into an (at least approximately) radial outward direction, and only then to join the axially diverging diffusor walls.

3. To design the diffusor-entrance profile smaller than would otherwise correspond to the absolute gas velocity at the exit from the rotor, for the purpose of accelerating the pressure fluid under pressure drop in the course of its deflection downstream of the rotor and upstream of the diffusor, with a view of avoiding boundary-layer detachments. At the diffusor entrance, an adapter may be provided (at least on one side) which has a direction parallel to the diffusor axis, in order to eliminate (partially at least) the whirl action issuing from the upstream curved guide portion, and to attain a pressure-fluid inflow which is aligned with the diffusor axis. At the points of deflection into the diffusor, deflector blades may be provided for the purpose of decreasing the deflection losses;

4. To design a diffusor to which an outlet scroll case is connected, the latter having a flow profile which varies so that the successively supplied pressure fluid at least does not give rise to a substantial pressure increase in the scroll case nor to any pressure—or flow reactions in the diffusor.

5. To equip the diffusor—over its entire length or only part thereof—with deflector elements or vanes of such design as to afford an optimal conversion of velocity into pressure and to avoid any substantial deflection losses. The said vanes may be set under such an angle to planes passing through the turbine axis as to direct the pressure fluid (at least partially) into the direction of flow in the outlet scroll case;

6. To afford means for only partially converting the rotor exit velocity into pressure in the diffusor adjacent the rotor and for bringing about a further such conversion only after the pressure fluid has passed through the diffusor, i. e. by means of at least one special or auxiliary diffusor disposed at the exit of the main diffusor. The flow profile of the scroll case itself also may be gradually enlarged so as to give origin therein to at least a partial conversion of velocity into pressure. Further, provision may be made, when applying my invention to turbines in which the rotor is supplied sectorwise through a plurality of separate intake ports, for corresponding partition walls or separator vanes disposed downstream from the rotor also, so as to produce, rearward of the rotor, diffusors which are separate from each other, wherein the velocity of the individual gas streams, downstream of the rotor, is converted (partly at least) into pressure;

In designs comprising a plurality of series-connected diffusors, the said separator vanes may be disposed along the entire or partial gas path in the primary diffusor, the outlet scroll-case and/or the auxiliary or secondary diffusor.

7. To open the space rearward of the turbine to the partial-vacuum spaces subsequent to the turbine rotor. In such arrangement, e. g. when driving turboblowers, cooling air may be sucked in along the stub shaft connecting turbine and blower. The cooling air also may be introduced so as to prevent access of the gas to the spaces between blower and turbine and/or its escape to the outside. The cooling air may be taken from the atmosphere or from any point of a driven blower, which is subjected to the pressure of the delivered pressure fluid.

The subject matter of my present invention is shown, by way of example and in various forms of application, in the accompanying drawings, in which:

Fig. 1 shows an axial section, on line I—I of Fig. 2, of a single-stage gas-turbine of mixed-admission type which drives a single-stage centrifugal blower, and which comprises a first form of invention, Fig. 2 a radial section on line II—II of Fig. 1, Fig. 3 an axial section of the turbine rotor blades and the adjoining diffusor, on line III—III of Fig. 1; and Fig. 3a represents a slight modification of the section shown in Fig. 3.

Fig. 4 a tangential section through guide vanes and rotor blades, as well as the diffusor vanes in the developed state, Fig. 4a the speed relationship in a blading according to Fig. 4, Fig. 5 the conditions with respect to values of state of the pressure fluid upon passing through the turbine and the adjoining diffusor, Fig. 6 an axial section, on line IV—IV of Fig. 7, of a single-stage gas turbine having axial admission, driving a single-stage blower, and comprising a second form of invention, Fig. 7 a radial section on broken line V—V of Fig. 6, in which the impeller is shown in elevation and its blading partially indicated, Fig. 8 an axial section, as in Fig. 6, but at a point where first only little pressure-fluid has passed from the turbine into the gas-outlet scroll case, Figs. 9–11 an axial section each through differently adapted diffusors, Figs. 12–16 each the incorporation of guide vanes into the turbine-outlet diffusors, Fig. 12 being a view of Fig. 11 in direction of arrow VI, Fig. 13 a view of Fig. 11 in direction of arrow VII, Fig. 15 a view of Fig. 14 in direction of arrow VIII, and Fig. 16 a view of Fig. 14 in direction of arrow IX, Figs. 17 and 18 an axial and a radial section respectively through a turbine with axial admission (similar as in Figs. 6 and 7), Fig. 17 being a section on line X—X of Fig. 18, and the latter a section on broken line XI—XI of Fig. 17, Figs. 19 and 20 a partial axial and a partial radial section respectively, through a turbine with mixed admission, Fig. 19 being a section on line XII—XII of Fig. 20, and the latter a section on line XIII—XIII of Fig. 19.

Like numerals designate similar parts and portions or, respectively parts and portions serving for similar purposes, and the letters refer to quantities of state of the pressure fluid for the turbine, and to the blade angles of the latter.

In Figs. 1 and 2, the subject matter of my present invention is illustrated by means of a gas turbine-driven blower comprising the turbine runner 1 and the blower impeller 2 which rotate as a unit. The turbine-intake casing 3 comprises two gas inlet ports 4 and 5. For the purpose of separating the gas streams, the inlet ports 4, 5 are separated from each other down to and also in the turbine guide-vane disc 7. The turbine-outlet casing 8 is provided with cooling spaces 9. 10 is the blower casing, and 11 a junction structure between turbine outlet casing 8 and blower casing 10. Junction structure 11 is provided with cooling spaces 12 also. The exit opening of outlet casing 8 is designated by 13.

In accordance with my present invention, now, a space 15 diverging downstream diffusor-like, adjoins the runner blading 14 which is of the mixed-admission type. The diffusor 15 is formed by two walls 16 and 17 which are conically flared so as to render the diffusor effective at cross-section 15' only. The diffusor effect, starting at 15', is built up in the conically flared diusor down to the cross-section 15''. The further diffusor portion extends to cross-section 15''' and is curved and is formed by the arcuate walls 18 and 19. The pressure fluid subsequently flows into the header 20 of turbine outlet casing 8, and finally through exit opening 13.

Fig. 1 further shows a duct 21 which supplies, e. g., air from blower casing 10 into the ring space 22 intermediate of the two sealing arrangements 23, 24 which serve for sealing the turbine shaft in the direction from turbine to blower or vice versa. Since, according to my present invention, the turbine, downstream of runner 1, operates under suction in diffusor 15, there arises a suction in space 25 in the direction toward the turbine runner and thus also toward the space 22. In the design described, it therefore becomes possible to suck air, e. g., along the turbine runner 1 from the blower through the duct 21, space 22 and the sealing 24 into the diffusor. Such air serves for cooling the turbine shaft and the turbine runner disc, and also prevents a passage of the gases from the turbine to the blower. The blower air sucked into diffusor 15, of course, also may be taken from any other point of the blower, e. g. from the space 26 downstream of blower impeller 2.

In a design according to Figs. 1 and 2, the gas-outlet scroll case 8, where it serves for receiving the gases, is of pear-shape. With respect to the axis through the discharge opening 13, the gases, after flowing out of the diffusor, flow to the left and right, and then merge in the discharge opening, whence they are conducted onward together, as shown by the arrows indicated in Fig. 2. In such form of outlet scroll-case 8, an approximately radial exit from the runner into the inside of the diffusor is of advantage. In such case, a uniform flow-off of the gases over the entire circumference of the runner and the diffusor into the case 8 is attained.

Fig. 3, now shows a section through the turbine blading and the diffusor, taken in the direction of the gas flow, i. e. in an axial-and-radial direction and according to line III—III of Fig. 1. The turbine guide wheel is designated by 7, the turbine runner by 1, the latter's blading by 14, and the diffusor downstream of the runner by 15. The inner entrance wall 27 of the diffusor may extend in the direction of the lower or inner edge 28 of the blade 14 and diverge conically only from cross-section 15' downstream to cross-section 15''. The divergence on the inner diffusor wall, however, also may begin—as shown by the line 31 of Fig. 3a—immediately adjoining the runner blade exit. Downstream of the conical diffusor, an arcuate diffusor portion comprising the walls 18 and 19, extends from cross-section 15'' to cross-section 15'''.

Fig. 4 shows a tangential section through the turbine portion according to line IIIa—IIIa of Fig. 3, which passes through the center of the runner blading 14. The stationary guide vanes are designated by 32, their entrance angle by $a_1$, the runner blades by 14, and their entrance and exit angles by $\beta_1$ and $\beta_2$ respectively. Beside Fig. 4, the arising gas-velocity triangles are shown in Fig. 4a, in which $c_0$ is the entrance velocity into the guide vanes 32; $u_1$ the peripheral velocity, $c_1$ the absolute and $w_1$ the relative entrance velocity into the runner blades 14; $u_2$, $w_2$ and $c_2$ respectively are the peripheral, the relative and the absolute speed of the gases from the runner. As we are dealing here with a turbine of mixed admission, $u_2$ is greater than $u_1$. The gases flow out of the blading shown approximately at right angles to the runner. The blade in the latter, however, also could be so adapted that the gases flow out obliquely to the runner plane.

In Fig. 4 also a portion of the partition 6 in the turbine-entrance casing, for separating the entrance gas-streams, is shown, as assumed in a turbine according to Fig. 1. In turbines of this type, a further partition 33 also may be provided downstream of runner 1. By virtue of such an arrangement, the diffusor, e. g. in case of two separate gas intake ducts, also is subdivided into two segment-like chambers separated from each other. In these two chambers then, the gas velocity is converted into pressure, unbiased by each other. The efficiency of the conversion is materially improved thereby.

It may be seen from Figs. 4 and 4a that, by virtue of the suction action of the diffusor in the case of a relatively large $c_2$, the blades do not have to give rise to a very pronounced deflection of the gas streams. The blade angles may be chosen large, so that the blade heights for a given gas volume may be made relatively small.

In Fig. 5, the course of the gas velocities, static pressures, and of the temperatures of the pressure fluid are plotted in function of the path covered by the gases from upstream of the runner to the end of the diffusor. These values are shown, in correspondence with Fig. 3, on the same elevation adjoining the Fig. 3. The velocity $c_0$ prevails upstream of the runner, and sharply rises to the value $c_1$ in the guide vanes. When emerging from the gap between runner and guide vanes, the gas velocity drops to approximately $c_1'$. The gases pass through the runner blading at the velocity $w$. In a blading of the action type, the said velocity $w$ remains approximately constant, neglecting losses. In a blading of the reaction type, however, and as assumed in Fig. 5, the said velocity rises down to the runner exit. Downstream of the runner, the gases flow approximately with the absolute velocity $c_2$ down to the entrance 15' of the diffusor proper. In the conically diverging diffusor, i. e. from cross-section 15' to cross-section 15", the velocity drops in accordance with the line $c_{d1}$. In the adjoining arcuate diffusor portion 15" to 15''', the gas velocity is still further decreased, according to line $c_{d2}$, and when leaving the arcuate diffusor portion, there remains the velocity $c_{d3}$ yet, which is necessary for urging the gases onward. The pressure at the different points of the turbine passage is represented by the line $p$. It may be seen that the pressure drops in the guide vanes as well as in the runner and assumes a value $p_e$ when leaving the latter, i. e. the pressure drops below the exit counterpressure $p_b$ of the turbine. In the diffusor 15, then, the pressure rises down to its end to a value sufficiently greater than the exit counterpressure $p_b$ so as to let the gases flow out from that point yet. The theoretical pressure $p_{th}$ also is plotted in Fig. 5, and is higher at all points than the actual gas pressure $p_e$. The course of the gas temperatures is shown by the dotted line $t$. The temperature in the rotor blading is lower than when the turbine would operate without the inventive diffusor. In the latter, the temperature slowly and gradually rises again.

Figs. 6 and 7 show the application of my present invention to a turbine rotor 1 with axial admission. The form of the diffusor 15 differs from that of Figs. 1 and 2. The conically enlarged diffusor portion 15'—15" is disposed radial, and the gases flowing out of rotor 14 are deflected from the axial into the radial direction, through the arcuate annular chamber 34 to the entrance 15' of the diffusor. The arcuate diffusor portion 15"—15''' joins cross-section 15", comprising the walls 18 and 19, and conducts the gases with a horizontal velocity component into the outlet scroll case 20. The latter is adapted, in contrast to the form shown in Figs. 1 and 2, as a casing of which the cross-sectional areas increase in the peripheral direction and through which the turbine gases are peripherally conducted to the tangential outlet opening 13 of the turbine outlet casing 8. The cross-sectional areas of the outlet scroll case 20 are gradually enlarged in accord with the gas volume flowing out of the diffusor, by successively enlarging the scroll case axially. This is done in order to avoid the necessity of enlarging the diameter of turbine case 8. One also, however, could apply a spiral enlargement of scroll case 20. The passage 20 of case 8 also may be so dimensioned as to afford therein a constant gas velocity, or the passage cross-sections in direction of the gas stream may be made to increase so as to correspond to the velocity which decreases due to friction and deflection. The enlargement, however, also could be so chosen as also to obtain a conversion of velocity into pressure in passage 20. In diffusor 15 and its curved entrance section 34, two separator vanes 33 are incorporated in order to maintain the separation of the gases flowing separately through the two ducts 4, 5 into the turbine, also in their passage through the diffusor. Such arrangement has been shown and described above with reference to Figs. 3 and 4.

Fig. 8 yet shows an axial section through that portion of diffusor and scroll case 20, where the gases start to flow from diffusor 15 into space 20. The inner wall 8' of the turbine, shown by dash-and-dot lines, of outlet case 8, indicates the boundaries of space 20 in a succeeding axial section disposed forward in direction of the gas stream. Space 20 then still is comparatively narrow in the axial direction, but gradually increases from the said point toward the turbine discharge port.

Fig. 9a shows an adaptation of diffusor 15, in which its entrance is narrowed down, so as to give rise to an acceleration of the gas velocity, after leaving the turbine rotor blading 14, in the curved annular space 34, with a view of avoiding, as far as possible, a detachment of the gas stream from the diffusor wall, and of decreasing the deflection losses. The cross-sectional construction is indicated by the wall portion 29 of Fig. 9.

In contrast to such constriction, an adaptation without the latter is shown in line 30 of Fig. 9a.

The conical, limited diffusor portions 15 in Figs. 9 and 9a diverge symmetrically on both sides.

Fig. 10 shows a partial axial section through a turbine of mixed admission, in which the gas stream, after leaving the rotor 14, also is radially deflected. This form of invention yet is characterized, as regards the special adaptation of the arcuate annular chamber 34 and the diffusor 15, in that a restriction 35 is provided between the chambers 34 and 15, which on its circumference has parallel or very slightly crowned walls 36. This short guide section 35 is intended to rectify or prevent the vortex action set up in the arcuate annular chamber 34, so that the gases flow into diffusor 15 in direction of the latter's axis. In Figs. 11–16, special outlet guide vanes 37 are provided in diffusor 15.

Fig. 12 is an axial view of the guide vanes 37, seen in direction of arrow VI in Fig. 11, and Fig. 13 a radial view of the said vanes in development, as seen in direction of arrow VII in Fig. 11.

According to Figs. 11–13, such guide vanes 37 are only disposed in the arcuate diffusor portion 15″—15‴, and serve for deflecting the gases, as far as possible, into the direction of the outlet scroll case 20 when entering into the latter. The vanes 37 at their exit may be disposed radial (with respect to the turbine axis) as shown in Fig. 12. They, further, advantageously are inclined—at least at their exit edge 15‴—with respect to the turbine axis, as shown in Fig. 13.

Figs. 14–16 show a diffusor design, in which the guide vanes 37 are disposed over the entire diffusor length and even beyond same in the arcuate annular chamber 34.

Fig. 15 shows an axial view in the direction of arrow VIII in Fig. 14, and Fig. 16 a radial view in the direction of arrow IX in Fig. 14.

Figure 1:
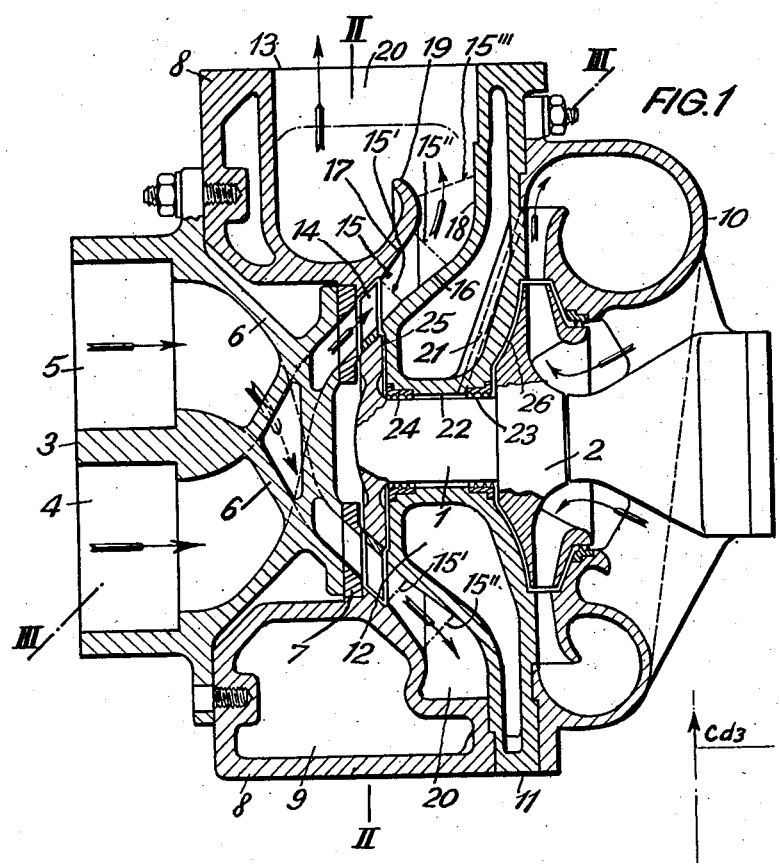
Figures 4, 4A:
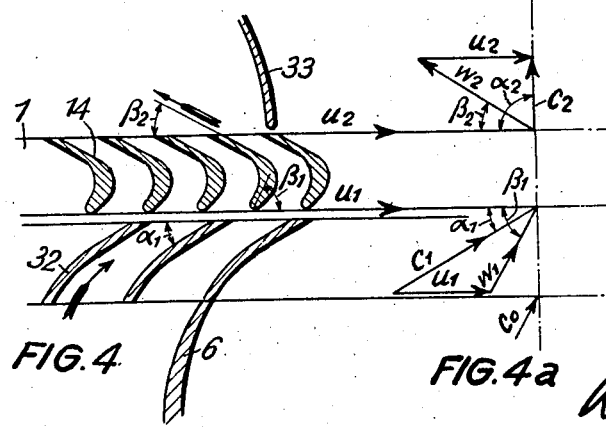

One clearly sees, in Figs. 14–16, the comparatively long blades 37 which are set askew with respect to the turbine axis. Further, a central vane or partition 38 is disposed yet in the arcuate entrance chamber 34 to diffusor 15, and in the latter itself. Partition 38, in advance of the entrance into diffusor 15, serves for decreasing the losses of deflection. In the diffusor portion 15′—15″, partition 38 permits of decreasing the angle of divergence in the two separate diffusor ducts 15″″ and 15‴″ and/or a lesser diffusor length with like or even more favorable velocity conversions. The provision of the curved partition 38 in diffusor portion 15″—15‴ again affords a more economical deflection, and/or the radius of curvature of the said diffusor portion may be made smaller, which fact also affords structural advantages.

The design according to Figs. 17 and 18 again deals with a turbine rotor 1 and blading 14 having axial admission. The gases pass in a radial direction into diffusor 15, through an annular chamber 34, as in the design shown in Fig. 6. The main difference, with respect to the latter, is that in diffusor 15 the velocity is only partially converted into pressure, and that the gases thence flow at comparatively still great velocity into chamber 20 of the outlet scroll case 8 which is gradually enlarged in accord with the gas volume flowing into chamber 20. From the latter, the gases before entering into the delivery connection 13, flow through a preferably straight diffusor 39. In the latter, the gas velocity is still further decreased, viz. down to a value which is sufficient for discharging the gases from opening 13. Such arrangement affords a smaller diameter and/or a lesser length of the gas discharge case and smaller passage cross-section in chamber 20.

In the design according to Figs. 17 and 18, the outlet scroll-case 8 is not provided with a cooling arrangement. The partitions or outlet guide-vanes 33 in diffusor 15, which separate the gas streams entering through the ducts 4 and 5, may be continued into scroll case 8 and also into the discharge diffusor 39. Such arrangement permits of keeping the gas streams separate from each other on their entire way from the rotor blading 14 down to the turbine discharge 13. The incorporation of such consecutive vanes 33, 33′ and 33″ is indicated in Figs. 17 and 18 by dash-and-dot lines.

Figs. 19 and 20 show a still further design for a turbine 1 of the mixed-admission type. The deflection of the gases—before entering into diffusor 15—is less than in case of a pure axial admission. In Fig. 19, one also may see guide vanes 37 which are sealed at their foot ends, as indicated by the dash-and-dot line, into the turbine-side wall 11′ of the junction structure 11.

Fig. 20 shows a connection of the two-part junction structure 11 which, in this case, is separated in an axial plane, i. e. the connection of the parts 8, 11 and 10 of the turboblower aggregate.

The subject matter of my present invention also may be applied in other types of turbines, e. g. turbines which do not comprise overhung rotors. Further, the turbine also may be of multi-stage design, in which case the invention preferably is applied at least to the turbine end or to the end of each rotor group. The turbine also may have admission from the incoming or driving side, in which case the diffusor, which is disposed downstream of the rotor, is disposed on the outside turbine side. The driven blower also may be of multi-stage design, and also may comprise an axial blading instead of a radial blading as shown in the drawings.

What I claim and desire to secure by Letters Patent is:

1. In a turbine having a rotor with blading adapted to receive pressure fluid therethrough in a direction having a substantial axial component, a pair of annular walls, both said walls being disposed apart from each other and having the turbine axis as their axis of symmetry, the first of said walls commencing in a circle substantially coinciding with the bases of the turbine blading, and the second of said pair of walls, surrounding the radially outer peripheries of the blading, both said walls extending in an initial direction coinciding substantially with the direction of the fluid flow through the blading, and said walls thereafter being directed at least partially radially outwardly and diverging from each other to form an annular diffusor for the pressure fluid.

2. In a turbine having a rotor with substantially axial flow type blading, a pair of annular walls separated from each other, both said walls having the turbine axis as symmetry, the first of said pair of walls commencing in a circle substantially coinciding with the bases of the turbine blading, and the second of said pair of walls surrounding the radially outer peripheries of the blading, both said walls extending in an initial direction coinciding substantially with the direction of fluid flow through the blading and said walls thereafter curving from substantially axial to substantially radially outward direction, said walls upon being so radially directed diverging from each other to form an annular diffusor for the pressure fluid.

3. A gas driven turbine comprising a rotor disc mounted on a shaft and adapted to rotate therewith, bearing means within which the shaft is rotatably supported, mixed flow type blading extending radially outward from said disc, entrance guide means for the pressure fluid, the last said means terminating in a nozzle, said nozzle being disposed closer to the turbine axis than said blading and being directed at least partially radially outward of said axis toward said blading, said entrance guide means further communicating with a source of hot gas, a pair of walls separated from each other and extending, one from the radially outer extremity of the exit edges of said blading, and the other wall, from the radially inner extremity of said exit edges, to define an annular passage disposed directly behind said blading, said passage being substantially aligned in axial section with the said nozzle, and said walls diverging for at least part of their extent to effect a diffusing action upon the gases received therein and passed therethrough.

4. A gas driven turbine comprising a rotor disc mounted on a shaft and adapted to rotate therewith, bearing means within which the shaft is rotatably supported, mixed flow type blading extending radially outward from said disc, entrance guide means for the pressure fluid, the last said means terminating in a nozzle, said nozzle being disposed closer to the turbine axis than said blading and being directed at least partially radially outward of said axis toward said blading, said entrance guide means further communicating with a source of hot gas, a pair of walls separated from each other and extending, one from the radially outer extremity of the exit edges of said blading, and the other wall, from the radially inner extremity of said exit edges, to define an annular passage disposed directly behind said blading, said passage being substantially aligned in axial section with the said nozzle, the walls extending from the said blading being curved in axial section to a substantially radial direction, and at least one of said walls thereafter diverging from said radial direction for at least a part of its extent to form a disc type diffusor for the gases received therein and passed therethrough.

5. The turbine as described in claim 3 wherein said annular passage comprises an annular space immediately following said blading and preceding the said divergence of the walls.

6. The turbine as described in claim 3 wherein the annular space receiving the gases directly from the rotor blading has an entrance throughflow cross-section which is at least equal to the entrance through-flow cross-section of the annular diffuser.

7. A turbine as described in claim 5 wherein the annular space is of such extent that the gases flow in an unchanged direction for a substantial distance after their delivery from the rotor blading and the diverging of the walls to form the annular diffusor does not commence until such flow has occurred and at a point where the cross-section of the diffusor-intake is substantially at right angles to the diffusor direction.

8. A turbine as described in claim 5 wherein the through-flow section of the first portion of the annular space is greater than the through-flow sections of the latter portion of the last said space and of the diffusor entrance, whereby the gases are accelerated with concomitant pressure drop in said annular space thereby avoiding boundary-layer detachments.

9. The turbine as described in claim 3 wherein a separate gas collecting scroll space is provided downstream of and communicating with the diffuser from which diffusor the gases are further received by said scroll space for ultimate conduction to the atmosphere.

10. The turbine as described in claim 3 wherein the direction of the annular diffusor is defined by pivoting a linear generatrix about a point on the turbine axis.

11. A turbine as described in claim 3 wherein the walls, before diverging to form the diffusor, become straight and parallel to the axis of divergence of the diffusor whereby vortex action arising in the initial portion of annular space is at least partially annulled and the gas entrance to the diffusor is directed towards the diffusor axis.

12. The turbine as described in claim 3 wherein a separate gas collecting scroll space is provided downstream of and communicating with the diffusor from which diffusor the gases are further received by said scroll space for ultimate conduction to the atmosphere, and a plurality of baffle or deflector partitions are disposed in the outlet portion of the diffusors askew of planes passing through the turbine axis whereby the gases are guided substantially in the direction of the current in the scroll.

ALFRED BÜCHI.

References Cited in the file of this patent

UNITED STATES PATENTS

| Number | Name | Date |
|---|---|---|
| 786,384 | Richards | Apr. 4, 1905 |
| 1,038,295 | Churchill-Shann | Sept. 10, 1912 |
| 1,180,403 | Leblanc | Apr. 25, 1916 |
| 1,276,154 | Zoelly | Aug. 20, 1918 |
| 1,310,682 | Sherbondy | July 22, 1919 |
| 1,368,751 | Rateau | Feb. 15, 1921 |
| 1,405,565 | Baumann | Feb. 7, 1922 |
| 1,853,133 | Meyer | Apr. 12, 1932 |
| 2,117,131 | Auger | May 10, 1938 |
| 2,165,448 | Browne | July 11, 1939 |
| 2,296,703 | Butler | Sept. 22, 1942 |
| 2,391,786 | Kenney | Dec. 25, 1945 |
| 2,442,019 | Ray | May 25, 1948 |
| 2,487,514 | Boestad et al. | Nov. 8, 1949 |

FOREIGN PATENTS

| Number | Country | Date |
|---|---|---|
| 214,686 | Switzerland | May 15, 1941 |
| 443,620 | Great Britain | Mar. 3, 1936 |
| 678,548 | France | Dec. 24, 1929 |